June 5, 1956     O. H. MURRAY     2,748,962
BOAT TRAILER
Filed July 17, 1953     2 Sheets-Sheet 1
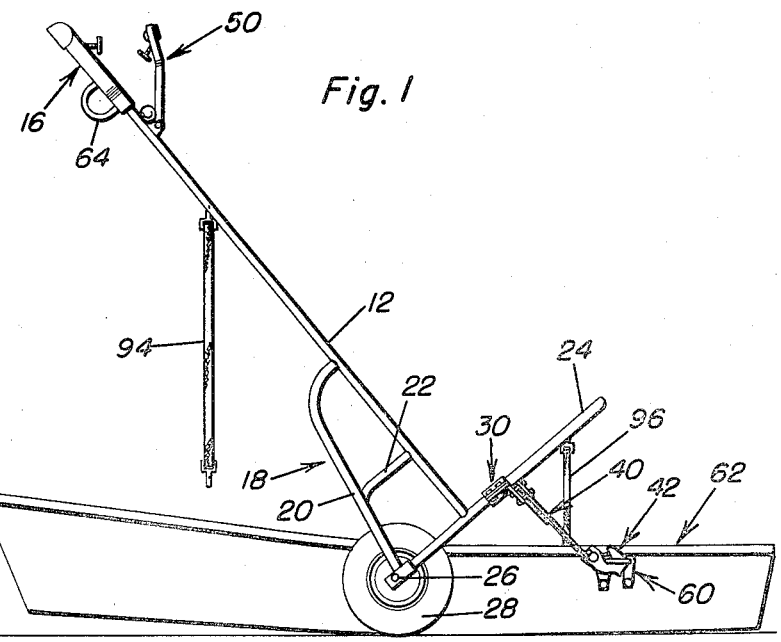
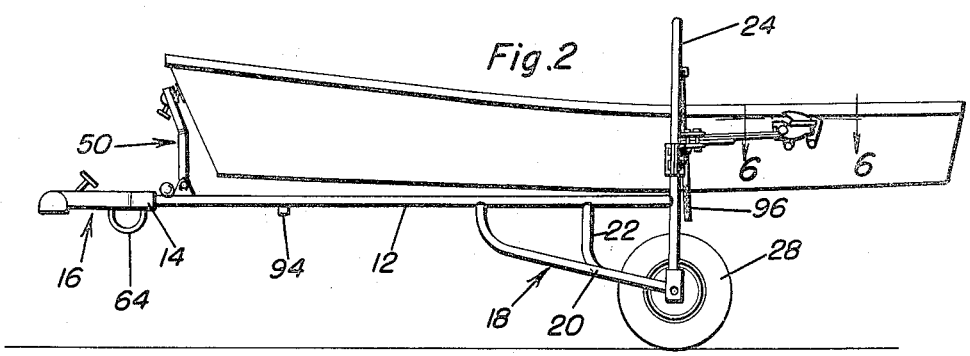
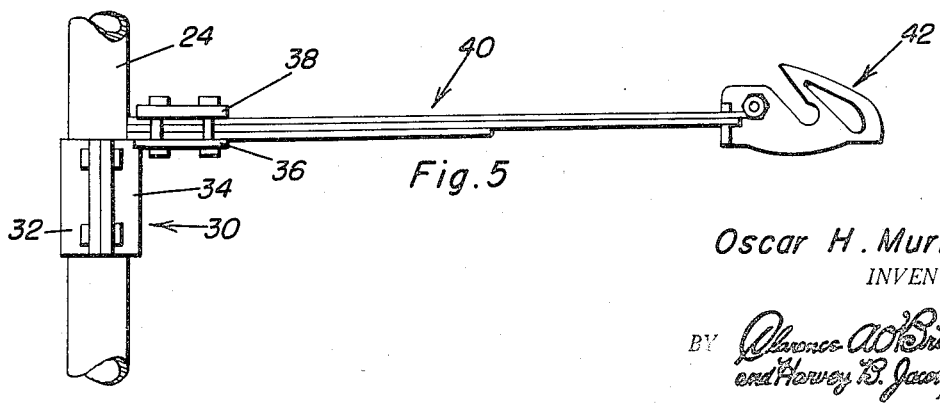
Oscar H. Murray
INVENTOR.

June 5, 1956   O. H. MURRAY   2,748,962
BOAT TRAILER
Filed July 17, 1953   2 Sheets-Sheet 2
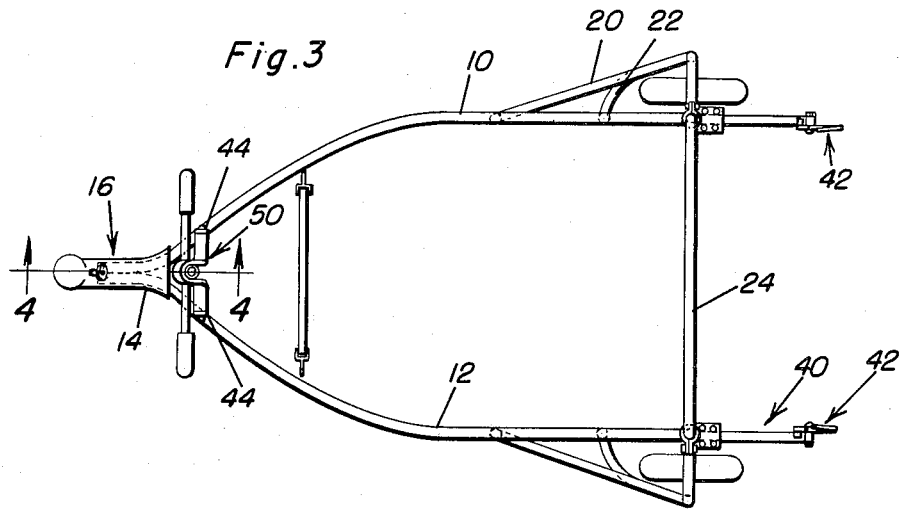
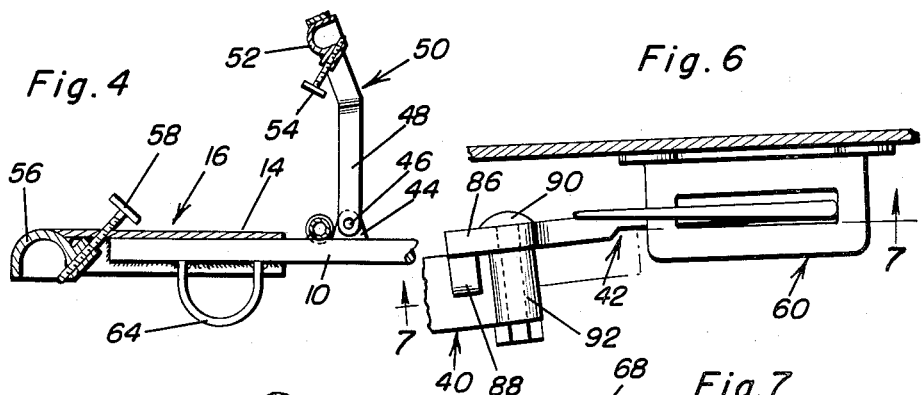
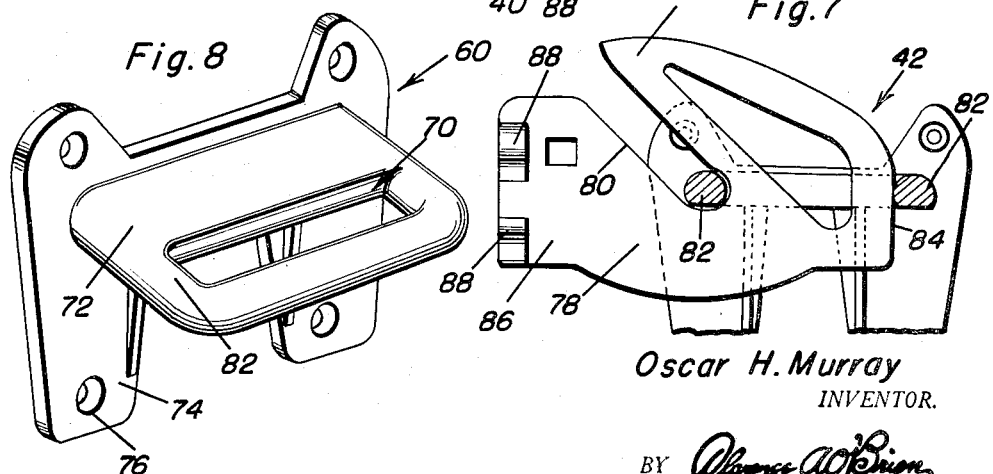
Oscar H. Murray
INVENTOR.

United States Patent Office 2,748,962
Patented June 5, 1956

2,748,962
BOAT TRAILER

Oscar H. Murray, Tampa, Fla., assignor to said Oscar H. Murray, William H. Murray, and Raymond E. Murray, Tampa, Fla., jointly Application July 17, 1953, Serial No. 368,588

1 Claim. (Cl. 214—373)

This invention relates generally to trailer mechanisms and pertains more particularly to a trailer particularly adapted for use in connection with boats.

A primary object of this invention is to provide an improved form of boat trailer which will enable a boat to be easily disposed thereon and securely locked in place with relation thereto while at the same time being floatingly carried thereby, the boat being at all times out of engagement with the frame of the trailer to prevent injury to the boat and its accessories.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the trailer and an associated boat showing the trailer in position at the beginning of the loading operation;

Figure 2 is another side elevational view showing the boat in loaded position on the trailer;

Figure 3 is a plan view of the trailer assembly;

Figure 4 is a vertical section taken substantially along the plane of section line 4—4 of Figure 3 showing details of the hitch mechanism and forward boat supporting mechanism on an enlarged scale;

Figure 5 is an enlarged elevational view showing the spring arm and associated hook for supporting the rear of the boat;

Figure 6 is a horizontal section taken substantially along the plane of section line 6—6 of Figure 2 showing details of the mounting hook and bracket assembly on an enlarged scale;

Figure 7 is a vertical section taken substantially along the plane of section line 7—7 of Figure 6 showing details of the hook and bracket assembly on an enlarged scale; and Figure 8 is a perspective view of the hook bracket.

Referring now more particularly to Figures 1–3, it will be seen that the trailer assembly consists essentially of the spaced side frame members 10 and 12 whose forward end portions are disposed in mutually convergent relation to terminate in juxtaposed ends received in the socket portion 14 of the ball hitch assembly indicated generally by the reference character 16, the manner of attachment between the ball hitch and the side frame members being effected in any suitable manner. The rearward portion of the frame assembly is provided with the depending wheel bracket assembly indicated generally by the reference character 18 which includes the lower brace rod 20 and the vertical brace rod 22 in the manner shown. The lateral frame arch 24 is connected at its lower end to the free end of the frame member 20 and suitable stub axles 26 are disposed thereat for journalling the wheels 28 thereon at opposite sides of the frame. Intermediate portions of the upright sections of the arch 24 are provided with brackets 30 which include the split sleeve members 32 and 34 suitably fastened together in clamping relation to the arch, one portion 34 being provided with a laterally extending leg 36 which operates in conjunction with the plate 38 to clampingly secure the spring 40 therebetween, the spring extending rearwardly beyond the trailer and provided at its free end with the hook member indicated generally by the reference character 42, see particularly Figure 5.

Adjacent the forward end of the side frame members 10 and 12 are provided the bracket ear members 44 which pivotally receive as by pin 46 the opposed legs 48 of the yoke member indicated generally by the reference character 50, which yoke member is provided at its upper free end with a socket member 52 having the manually operable locking bolt 54 associated therewith for a purpose presently apparent. The previously mentioned ball hitch assembly 16 is also provided with a socket member 56 at its forward end and is provided with an associated locking bolt 58, this hitch being adapted for connection to a ball member securely carried by a towing vehicle.

Referring now more particularly to Figure 1, it will be seen that the trailer assembly is tiltable about the transverse axis defined by the stub axle 26 to the position shown wherein the hook members 42 are engageable with apertured brackets 60 secured adjacent the stern portion of the boat 62. When the hooks have been engaged with the brackets, the forward end of the frame is tilted downwardly until the stand loop 64 is in engagement with the ground surface whereupon the bow of the boat is lifted so that the ball 66 thereon is received in the socket of the yoke assembly 50. It will be appreciated that the locking screws 54 may be threaded inwardly with relation to the socket 52 to firmly engage within the reduced portion of the ball 66 to prevent disengagement of the ball from the socket. Thereupon, the forward end of the trailer may be lifted so that the ball hinge is engaged with the ball member on an associated towing vehicle so that the assembly assumes the position shown in Figure 2.

Referring now more particularly to Figures 7 and 8, it will be seen that the hook members 42 include the end 68 projectable through the opening 70 on the lateral weight portion 72 of the bracket assembly 60, the securing plate portion 74 thereof being suitably apertured as at 76 for the reception of fastening elements to secure the brackets to the sides of the boat. The ends 68 of the hooks are disposed in overlying relation to the handle portion 78 to present the slots 80 of substantially uniform width which are of a width corresponding to the end portion 82 of the bracket plate portion 72 surrounding the aperture 70 therein and it will be appreciated that the width of the hook between the innermost end of these slots and the opposite sides 84 thereof is just sufficient to effect positive and firm engagement of the hooks between the end portions 82 of the bracket plate portions 72 in the manner indicated most clearly in Figure 7, this manner of engagement preventing longitudinal shifting between the boat and the trailer frame. The shank 86 of each hook is provided with lateral ears 88 thereon which engage above and below the spring 40 and the fastener 90 extending therethrough and through the eye portion 92 of the spring prevents relative rotation between the spring and the hook, see most particularly Figure 6. When in the supporting position, the safety straps 94 and 96 may be looped under the bottom of the boat in the manner shown in Figure 2.

By utilizing the above described trailer assembly, it will be readily appreciated that the boat at no time comes into positive contact with the frame portion of the trailer and that the boat is tiltingly carried thereby to obviate excessive jarring of the boat should the trailer be hauled over bumpy or uneven ground surfaces. The resiliency of the spring 40 in conjunction with the pivotal connection of the yoke assembly 50 to the frame side members 10 and 12 effects the floating support of the boat with relation to the trailer frame.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

In a boat trailer, a wheeled frame including a pair of spaced side members adapted to straddle the sides of a boat and having front hitch ends connected together, an arch member connecting said side members together at rear ends thereof and adapted to extend across a boat, said arch member having vertical side sections rising from said side members, a pair of spring arms extending rearwardly from said vertical side sections above said side members and having front and rear ends, sleeves on the front ends of said spring arms vertically slidably adjustable on said vertical side sections to adjust said spring arms vertically, and means for attaching said spring arms to a boat comprising a pair of rectangular frames attachable to opposite sides of a boat, and a pair of forwardly inclined hooks on the rear ends of said spring arms fitting upwardly in said frames and interlocking therewith.

References Cited in the file of this patent
UNITED STATES PATENTS

| | | |
|---|---|---|
| 2,375,754 | Ballinger | May 15, 1945 |
| 2,451,236 | Oeth | Oct. 12, 1948 |
| 2,522,616 | Husek | Sept. 19, 1950 |
| 2,562,596 | Bonfietti | July 31, 1951 |
| 2,564,702 | Linneman | Aug. 21, 1951 |
| 2,626,072 | Holschlaw | Jan. 20, 1953 |
| 2,664,577 | Sanborn | Jan. 5, 1954 |